(12) United States Patent
Dubnicki et al.

(10) Patent No.: US 7,870,218 B2
(45) Date of Patent: Jan. 11, 2011

(54) PEER-TO-PEER SYSTEM AND METHOD WITH IMPROVED UTILIZATION

(75) Inventors: Cezary Dubnicki, Monmouth Junction, NJ (US); Cristian Ungureanu, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 0 days.

(21) Appl. No.: 10/813,484

(22) Filed: Mar. 30, 2004

(65) Prior Publication Data

US 2004/0215622 A1    Oct. 28, 2004

Related U.S. Application Data

(60) Provisional application No. 60/461,397, filed on Apr. 9, 2003.

(51) Int. Cl.
G06F 15/167 (2006.01)
G06F 15/173 (2006.01)
G06F 15/16 (2006.01)
G06F 7/00 (2006.01)
G06F 17/30 (2006.01)

(52) U.S. Cl. ................... 709/213; 709/226; 709/232; 707/622; 707/620; 707/831

(58) Field of Classification Search ......... 709/213–216, 709/218, 231, 223, 226, 229, 232; 707/10, 707/622, 620, 831
See application file for complete search history.

(56) References Cited

U.S. PATENT DOCUMENTS

| 5,544,347 | A  | 8/1996 | Yanai et al. |
|---|---|---|---|
| 5,742,792 | A  | 4/1998 | Yanai et al. |
| 5,909,692 | A  | 6/1999 | Yanai et al. |
| 6,092,066 | A  | 7/2000 | Ofek |
| 6,101,497 | A  | 8/2000 | Ofek |
| 6,108,748 | A  | 8/2000 | Ofek et al. |
| 6,421,730 | B1 | 7/2002 | Narad et al. |
| 6,704,730 | B2 | 3/2004 | Moulton et al. |

(Continued)

OTHER PUBLICATIONS

Ratnasamy et al., "A scalable content addressable network", , Aug. 2001, ACM, pp. 161-172.*

(Continued)

*Primary Examiner*—Ario Etienne
*Assistant Examiner*—Gregory G Todd
(74) *Attorney, Agent, or Firm*—Joseph Kolodka

(57) ABSTRACT

The present invention is directed to improving utilization in a peer-to-peer network. Each node in a peer-to-peer network is assigned a number of preferably fixed-size storage slots proportional to the node storage, a first portion of which is allocated to storage zones and a second portion of which is allocated as a free slot reserve. In accordance with an embodiment of an aspect of the invention, this split of a storage zone is delayed until the storage zone becomes full, referred to herein as "lazy splitting". In accordance with an embodiment of another aspect of the invention, it is advantageous to allocate more storage slots at a node than its actual physical capacity referred to herein as "oversubscription". In accordance with an embodiment of another aspect of the invention, each physical node is allocated at least one storage zone, even as a new node is added to the system.

10 Claims, 9 Drawing Sheets

U.S. PATENT DOCUMENTS

| | | | |
|---|---|---|---|
| 6,728,223 | B1 | 4/2004 | Litzenberger et al. |
| 6,807,632 | B1 | 10/2004 | Carpentier et al. |
| 6,810,398 | B2 | 10/2004 | Moulton |
| 6,826,711 | B2 * | 11/2004 | Moulton et al. ............... 714/6 |
| 6,857,059 | B2 * | 2/2005 | Karpoff et al. ............ 711/209 |
| 6,904,457 | B2 * | 6/2005 | Goodman ................. 709/221 |
| 6,938,042 | B2 * | 8/2005 | Aboulhosn et al. ..... 707/999.01 |
| 6,985,928 | B2 * | 1/2006 | Zhang et al. ............... 709/213 |
| 7,069,295 | B2 * | 6/2006 | Sutherland et al. ......... 709/203 |
| 7,263,596 | B1 * | 8/2007 | Wideman et al. .......... 711/209 |
| 7,370,083 | B2 * | 5/2008 | Husain et al. ............. 709/213 |
| 7,499,980 | B2 * | 3/2009 | Gusler et al. .............. 709/214 |
| 7,555,553 | B2 * | 6/2009 | Zhang et al. ............... 709/226 |
| 2001/0037323 | A1 | 11/2001 | Moulton et al. |
| 2002/0048284 | A1 | 4/2002 | Moulton et al. |
| 2002/0107722 | A1 | 8/2002 | Laurin et al. |
| 2002/0147815 | A1 * | 10/2002 | Tormasov et al. .......... 709/226 |
| 2002/0161983 | A1 * | 10/2002 | Milos et al. ................ 711/202 |
| 2002/0194340 | A1 * | 12/2002 | Ebstyne et al. ............. 709/226 |
| 2003/0149750 | A1 * | 8/2003 | Franzenburg .............. 709/220 |
| 2003/0179750 | A1 | 9/2003 | Hasty, Jr. et al. |
| 2003/0187853 | A1 * | 10/2003 | Hensley et al. ............... 707/10 |

OTHER PUBLICATIONS

Stoica, I. et al., "Chord: a Scalable peer-to-peer lookup service for internet applications", in SIGCOMM'01, Aug. 2001.

Ratnasamy, S. et al., "A Scalable Content-Addressable Network", in SIGCOMM'01, Aug. 2001.

Hildrum, K. et al., "Distributed Object Location in a Dynamic Network", in SPAA'01, Aug. 2002.

Malkhi, D. et al., "Viceroy: A Scalable and Dynamic Emulation of the Butterfly", in PODC'02, Jul. 2002.

Cox, R. et al., "Serving DNS Using a Peer-to-Peer Lookup Service", in 1st International Workshop on Peer-to-Peer Systems, 2002.

Rowstron, A. et al., "Pastry" Scalable, decentralized object location and routing for large-scale peer-to-peer systems; in Proceedings of the 18th IFIP/ACM International Conference on Distributed Systems Platforms, Nov. 2001.

Zhao, B.Y. et al., "Tapestry: An Infrastructure for Fault-tolerant Wide-Area Location and Routing", Technical Report No. UCB/CSD-01-1141, Computer Science Division, University of California, Apr. 2001.

Maymounkov, P. et al., "Kademlia: A peer-to-peer information system based on the XOR metric", in Proceedings of the 1st International Workshop on Peer-to-Peer Systems, 2002.

Rowstron, A. et al., "Storage management and caching in PAST, a large-scale, persistent peer-to-peer storage utility", in Symposium on Operating Systems Principles, 2001.

Byers, J. et al., "Simple load balancing for distributed hash tables", in 2nd International Workshop on Peer-to-Peer Systems, 2002.

I. Stoica et al., "Chord: A Scalable Peer-to-Peer Lookup Service for Internet Applications", Proceedings of the 2001 ACM SIGCOMM '01 Conference, pp. 149-160 (Aug. 2001).

B.Y. Zhao et al., "Tapestry: An Infrastructure for Fault-Tolerant Wide-Area Location and Routing", Tech. Rep. UCB/CSD-01-1141, Univ. of California at Berkeley, Computer Science Department Apr. 2001.

A. Rowstron and P. Druschel, "Pastry: Scalable, distributed object location and routing for large-scale peer-to-peer systems". IFIP/ACM International Conference on Distributed Systems Platforms (Middleware), Heidelberg, Germany, pp. 329-350, Nov. 2001.

S. Ratnasamy et al., "A Scalable Content Addressable Network", Proc. of ACM SIGCOMM, pp. 161-172, Aug. 2001.

* cited by examiner

PEER-TO-PEER SYSTEM AND METHOD WITH IMPROVED UTILIZATION

This Utility Patent Application is a Non-Provisional of and claims the benefit of U.S. Provisional Patent Application Ser. No. 60/461,397 filed on Apr. 9, 2003, the contents of which are incorporated by reference herein This application relates to U.S. Utility patent application Ser. No. 10/813,504, entitled "PEER-TO-PEER SYSTEM AND METHOD WITH PREFIX-BASED DISTRIBUTED HASH TABLE," filed on Mar. 29, 2004, contemporaneously with this application and incorporated by reference in its entirety.

BACKGROUND OF THE INVENTION

The invention relates to distributed systems and, more particularly, to storage systems that utilize distributed hash tables.

Peer-to-peer ("P2P") systems have become very popular and are a major source of traffic on the Internet today. Still, first generation file sharing systems, such as NAPSTER and GNUTELLA, have been shown to have significant scalability issues. Recently, a number of research groups have proposed a new generation of scalable P2P systems based on distributed hash tables (DHTs). See, e.g., I. Stoica et al., "CHORD: A Scalable Peer-to-Peer Lookup Service for Internet Applications," in Proceedings of the 2001 ACM SIGCOMM '01 Conference, pp. 149-60 (San Diego, Calif., August 2001); B. Y. Zhao, et al., "TAPESTRY: An Infrastructure for Fault-Tolerant Wide-Area Location and Routing," Tech. Rep. UCB/CSD-01-1141, University of California at Berkeley, Computer Science Department 2001; A. Rowston and P. Druschel, "PASTRY: Scalable, Decentralized Object Location, and Routing for Large-Scale Peer-to-Peer Systems," Lecture Notes in Computer Science, Vol. 2218, p. 329, 2001; S. Ratnasamy, et al., "A Scalable Content Addressable Network," in Proc. of ACM SIGCOMM, pp. 161-72 (San Diego, Calif., August 2001). In these systems, a hash key is associated with a file and each node in the system is responsible for storing a certain range of hash keys. A lookup for a particular key is routed through the DHT network to the node responsible for the key using a specific routing algorithm.

Storage utilization, typically measured by the ratio of used storage to physical capacity, is extremely important for commercial viability of applications such as archive repositories. The ad-hoc and dynamic nature of conventional P2P networks, unfortunately, have motivated existing DHT-based networks to keep only minimal state per node, resulting in long routing paths and systems with poor utilization. Such architectures are not as suitable for commercial P2P applications, where the resource sharing is long-term and resources are contributed in a well-defined manner with predefined local rules of engagement. Accordingly, there is a need for different type of peer-to-peer architecture that takes advantage of the nature of the stable dedicated resources to offer better utilization and performance than traditional P2P systems.

SUMMARY OF INVENTION

The present invention is directed to improving utilization in a peer-to-peer network. Each node in a peer-to-peer network is assigned a number of preferably fixed-size storage slots proportional to the node storage, a first portion of which is allocated to storage zones and a second portion of which is allocated as a free slot reserve. As more and more data is added to each storage zone, a storage zone can be split so that a portion of the data in the storage zone can be transferred to a free slot reserve slot which is converted into a new storage zone. In accordance with an embodiment of an aspect of the invention, such a split of a storage zone is delayed until the storage zone becomes full. The inventors refer to this technique as "lazy splitting." When there are no more free slot reserve slots available at a node, a storage zone can be transferred to another node in the peer-to-peer network. It is advantageous to maintain a data structure at the previous node regarding the zone transfer while information takes time to propagate through the peer-to-peer network.

In accordance with an embodiment of another aspect of the invention, it is advantageous to allocate more storage slots at a node than its actual physical capacity. The inventors refer to this technique as "oversubscription." Each node would have a number of actual slots which amount to its actual physical capacity and a number of "virtual slots", preferably N−1 virtual slots for each N actual storage slots allocated at the node. If the actual physical capacity of a node is filled up, a storage zone on the node can be transferred to another node in the peer-to-peer network. The search for a new node in the peer-to-peer network can notably be a local search using a transfer set of node candidates.

In accordance with an embodiment of another aspect of the invention, each physical node is allocated at least one storage zone, even as a new node is added to the system. When a new node is added to the peer-to-peer network, a search is conducted for a node with at least two zones, one of which can be transferred to the new node. If none exists, then what the inventors refer to as an "eager split" occurs: one of the storage zones is split into two portions even before it reaches its full capacity, and one of the two portions is transferred to the new node. Zones can be split "eagerly" so that each physical node has at least one zone but no more than one eagerly split zone.

When the techniques of lazy splitting and oversubscription are used together, it can be shown that the theoretical guaranteed utilization can be $U=(N-1)/N$. Thus, a high guaranteed utilization can be achieved which not only holds for the system's entire lifetime as it grows, but is advantageously also achievable with only a bandwidth consumption. These and other advantages of the invention will be apparent to those of ordinary skill in the art by reference to the following detailed description and the accompanying drawings.

DETAILED DESCRIPTION

Figure 1:
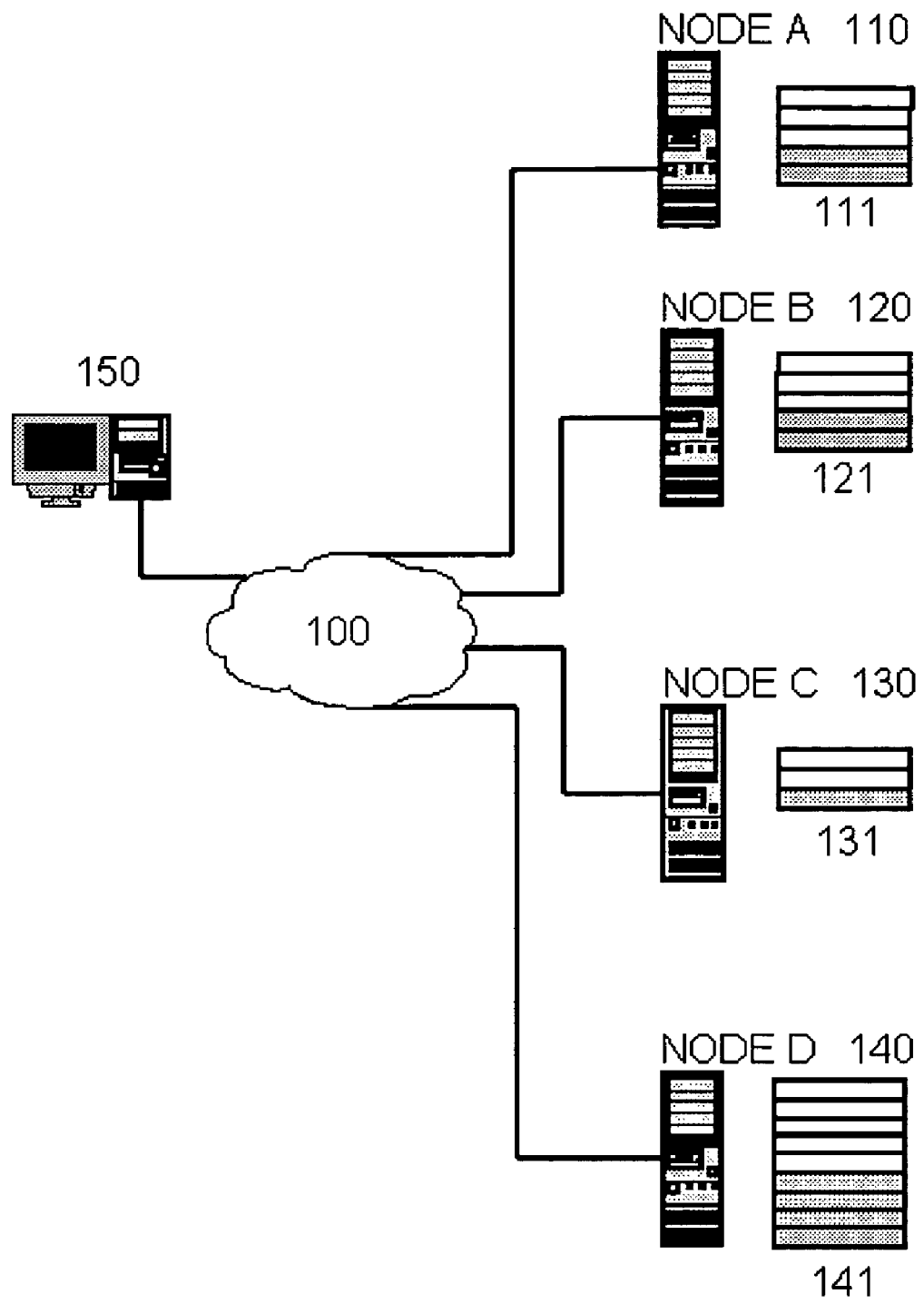
FIG. 1 is a diagram of a commercial peer-to-peer system, configured in accordance with an embodiment of an aspect of the invention.

FIG. 1 is a diagram of a commercial peer-to-peer system, configured in accordance with an embodiment of an aspect of the invention. A plurality of physical nodes, illustratively 110, 120, 130, 140, communicate with each other through an underlying transport network 100. There is no restriction on the location or grouping of the physical nodes 110, 120, 130, 140 with regards to the present invention. The physical nodes can vary in actual storage space, processing power, and other resources. Each physical node is responsible for the storage and retrieval of one or more objects. In accordance with a preferred embodiment, each object is associated with a hash key of a hash function. Any advantageous hashing function that maps objects to a hash key can be utilized in the context of the present invention. One or more clients 150 can communicate with a physical node and issue a request for a particular piece of data using a hash key. The hashkeys, and accordingly, the objects, are grouped into what are referred to as "zones." Each zone is a subspace of the hashkey space which is hosted at a particular slot in a particular physical node. It is assumed that keys of the objects to be stored are uniformly distributed. For example, and without limitation, keys generated by the SHA-1 function can be shown to generate such a distribution. See "Secure Hash Standard," in FIPS Publication 180-1, National Institute of Standards and Technology, April 1995.

It is assumed that the system provides for the periodic exchange of messages, e.g., pings, between nodes in order to detect failures and propagate changes in the network. For example, a ping cycle loop could be executed where ping messages are exchanged with neighbors in a fixed interval defined by a system-wide constant. Based on the ping messages received, a node/zone could reconcile all received information with its local state and prepare outgoing pings for the next exchange phase.

The system using a given load balancing scheme is said to reach a "system full" state when there exists a key such that its insertion cannot be performed due to the lack of space. The "guaranteed utilization" is said to be U if the system cannot be full if its utilization is below U.

A simple way to add a new node physical node to the system is to pick a random hashkey, determine the zone F responsible for it and the physical node hosting it, split F into two new zones, and transfer one of these new zones to the new physical node. This scheme, which the inventors refer to as the "base scheme," suffers from one problem: randomly choosing the zone to split gives rise to big inequalities in the areas of the generated zones (factors of log(n) are possible, where n is the number of physical nodes in the system). When keys are distributed uniformly, some physical nodes will fill up when other physical nodes are only 1/log(n) full, leading to poor overall system utilization.

An improvement to the base scheme is based on the idea of grouping randomly selected zones into sets, e.g., of some fixed cardinality N. A physical node is responsible for hosting the entire sets of zones, as opposed to only one zone. The physical nodes preferably arrange their storage capacity in what the inventors refer to as a number of "slots" whose number can be roughly proportional to the amount of storage available to the physical node. The slots are preferably of a fixed size, denoted SlotSize. This is depicted abstractly in FIG. 1. Thus, for example, a host with a 1 TB capacity could be used to host five zones, each of which could grow to 200 GB, giving a value of N=5. SlotSize is a system-wide constant representing the limit size to which a zone can grow before it fills the slot and it must be split. Because the likelihood that many of the bigger zones are grouped together is small, the ratio between the loads of the biggest set and that of the average set is advantageously significantly smaller than the ratio for individual zones. It is important to note that individual zones can still have big differences in load, and it is only for sets of zones that the differences are smaller. This technique is referred to as "aggregation" which, when utilized in conjunction with other simple heuristics, can significantly increase the utilization.

In accordance with an embodiment of an aspect of the invention, it is advantageous to split a zone only when it becomes full or nearly full, a technique which the inventors refer to as "lazy splitting." Nodes that are added to the system before they are needed, i.e., before a split becomes necessary, constitute a "free slot reserve" from which slots are extracted and integrated into the distributed hash table when necessary, i.e., when zones are split. The lazy splitting technique reduces the imbalance in the network to two (i.e., the largest zone is at most twice as large as the smallest zone) provided the keys of the data to be stored are uniformly distributed. For a given number of keys, this technique uses the minimal number of zones possible, which also translates in to the minimum number of nodes. This technique alone can bring the guaranteed system utilization to 50%, since it is easy to see that when the system becomes full, the free physical node reserve must be empty and each node is at least 50% full. Unfortunately, this is also a tight bound, since a system with such utilization can be obtained (all nodes but one are half-full, and one node is full).

Aggregation allows both allocated and un-allocated slots on the same node, as depicted in FIG. 1. It is advantageous to enforce the condition that every node in the system hosts at least one zone (one allocated slot). The system then can rely on the distributed hash table-based mechanisms to take care of maintaining information about each nodes' network addresses and their status. There would be no need for extra messages to maintain the free slot reserve.

Figure 3:
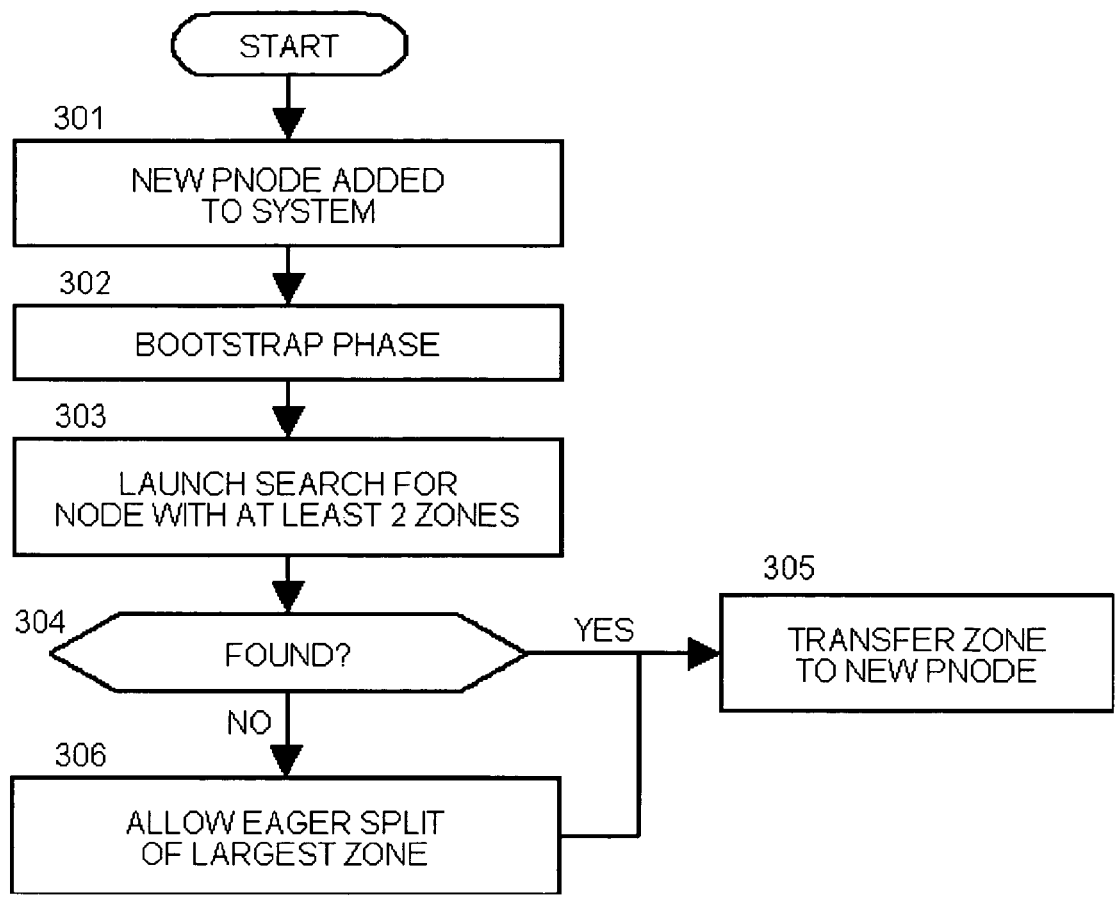
FIG. 3 is a flowchart of processing performed when a new physical node is added to the peer-to-peer system, in accordance with an embodiment of an aspect of the invention.

FIG. 3 is a flowchart of processing performed when a new physical node is added to system, in accordance with an embodiment of this aspect of the invention. At step 301, the new physical node is added to the network, and, at step 302, a "bootstrap" phase occurs in which the physical node locates the rest of the peer-to-peer network. For example and without limitation, this can be done by associating a domain name system name with a given distributed hash table network, as described in S. Ratnasamy et al., "A Scalable Content Addressable Network," in Proc. of ACM SIGCOMM, 2001, which is incorporated by reference herein. After locating the peer-to-peer network the new physical node conducts a search for a physical node hosting multiple zones at step 303. This watch need not be a global one. Only up to a fixed number of physical nodes need be contacted. If a node hosting at least two zones is found at step 304, then one such zone is transferred, as depicted in step 305, to the new physical node. This reestablishes the invariant that each node has at least one zone. If, however, only physical nodes with one zone are found, then one such zone is selected for what the inventors refer to as an "eager" split. At step 306, the zone is split, generating two children zones, and one of them is transferred to the new physical nodes. To limit the network imbalance, it is preferable to select the largest possible zone for the split in such a case.

The search for a physical node with multiple zones is performed in order to limit the number of zones in the network and, consequently, the imbalance between the zone sizes. It should be noted that the success or failure of the search does not affect the storage utilization. It can be shown that the worst-case minimal utilization does not change if the physical nodes are limited to no more than one eagerly split zone. It is advantageous to make sure that an eagerly split zone is not transferred to a physical node which already has such a zone. Having two eagerly split zones is clearly not necessary since the same zone can be eagerly split many times (each time one of the new zones is transferred to a new physical node). Once an eagerly split zone becomes full, it can revert to being a "normal" zone.

Figure 2:
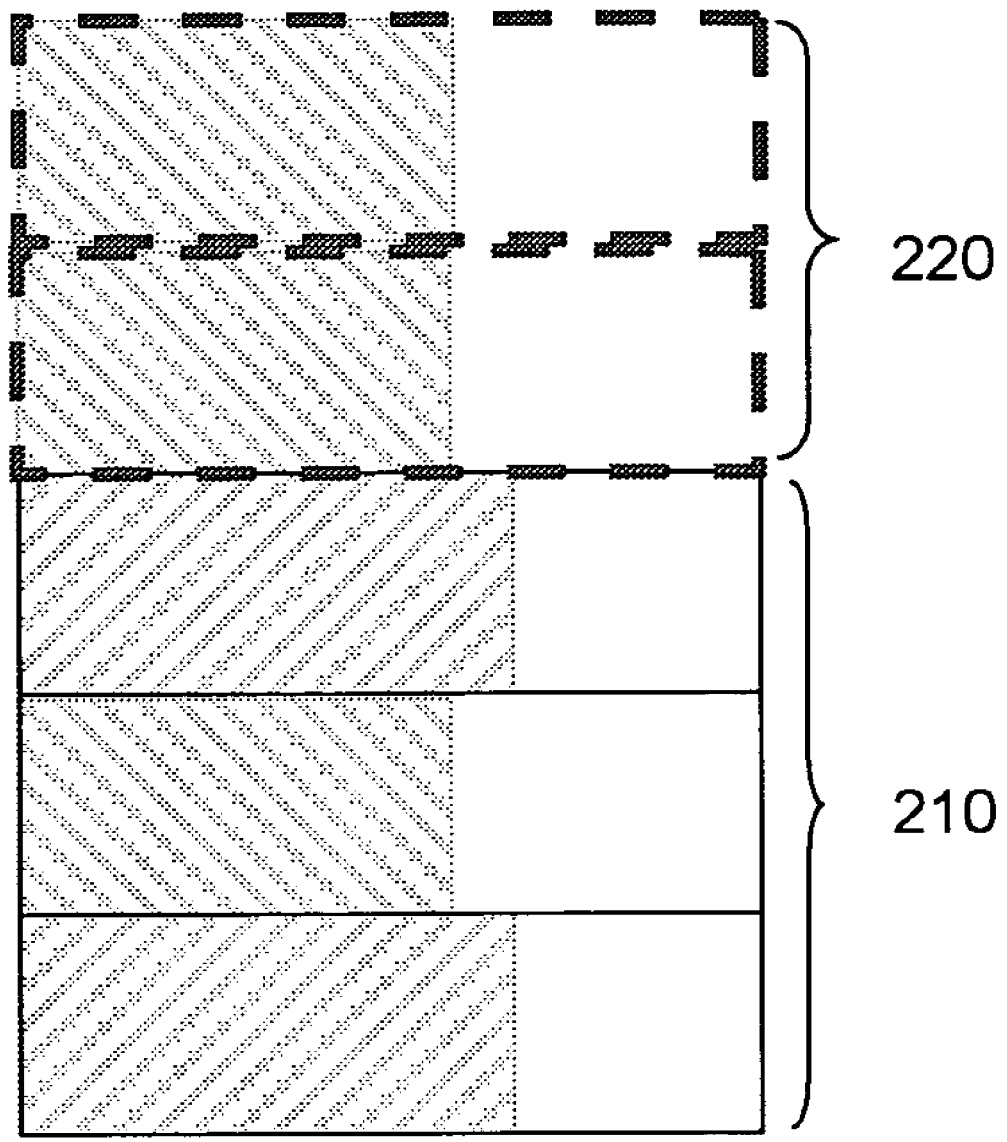
FIG. 2 is an abstract diagram illustrating the arrangement of storage slots on an example physical node in the peer-to-peer system.

In accordance with an embodiment of another aspect of the invention, it is advantageous to allow each physical node to hold more slots than would actually fit given its capacity. In other words, the physical node "pretends" that it has more space than is actually available at the physical node. The inventors refer to this technique as "oversubscription." It is observed that if the zones residing on a node are lightly loaded (as most of them are when the system has low utilization), there is enough storage on the node to host extra zones. Consequently, the above-mentioned aggregation technique can be advantageously modified as follows. In accordance with a preferred embodiment of the invention, each physical node is assigned a number of slots equal to $2 \times N-1$ slots, where N=C/SlotSize and C is the node's capacity. This is illustrated by FIG. 2. The physical node in FIG. 2 has actual capacity of 300 GB where the SlotSize is 100 GB. Thus the physical node, for example, 110, has three "real" slots 210 and two "virtual" slots 220, each of which are partially filled. Groups of "real" and "virtual" slots are also depicted in FIG. 1 at reference numbers 111, 121, 131, 141.

Oversubscription advantageously allows the achievement of utilizations higher than 50%. When the techniques of lazy splitting and oversubscription are used together, it can be shown that the theoretical utilization can be $U=(N-1)/N$ where N is a system parameter. Practical values of N result in a guaranteed utilization of 80-85%. This guarantee not only holds for the system's entire lifetime (as it grows), but is advantageously also achievable with only a modest increase in bandwidth consumption.

Although the oversubscription technique is described above in terms of identical physical nodes, the scheme can be readily extended to heterogeneous physical node. For example, each physical node can be assigned a number of slots equal to $2 \times N_{node}-1$, where $N_{node}=\lfloor C_{node}/SlotSize \rfloor$. It can be shown that the guaranteed utilization for such a system is given by (AverageN-1)/AverageN where AverageN denotes the average (overall the nodes in the network) number of slots per node.

Figure 4:
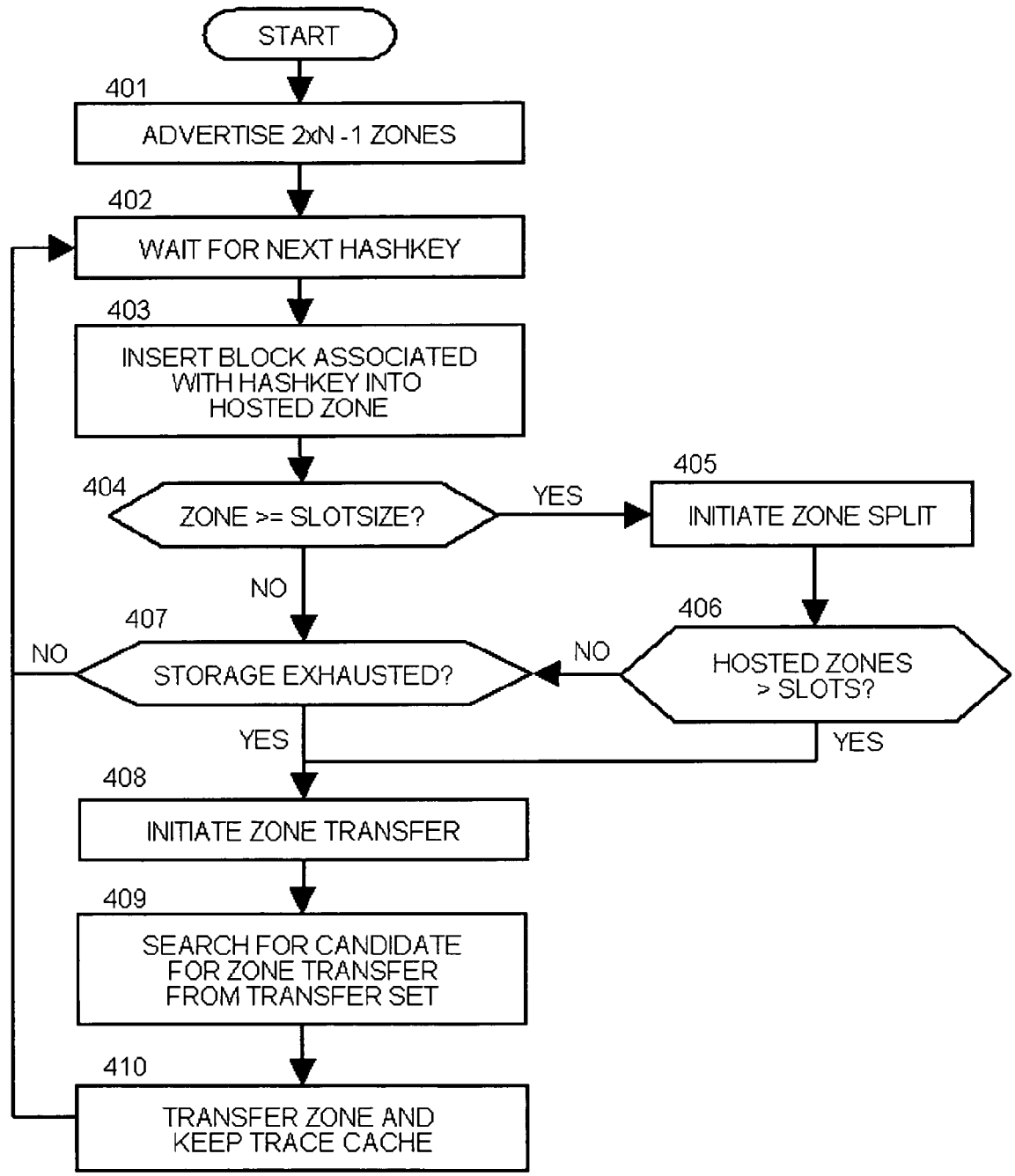
FIG. 4 is a flowchart of processing performed in accordance with an embodiment that combines oversubscription and lazy splitting techniques.

FIG. 4 is flowchart of processing performed in accordance with an embodiment that combines the oversubscription and lazy splitting techniques. At step 401, the node advertises more storage slots than actually reflected by its physical capacity, e.g., $2 \times N-1$ slots. At step 402, the node awaits the insertion of the next hashkey. At step 403, a hashkey is inserted into a zone hosted by the node, and the node proceeds to store the data block/object associated with the hashkey into the hosted zone. At step 404, a check is made of the size of the hosted zone. If the zone size has reached SlotSize (or within some system parameter of the SlotSize), then, in accordance with the lazy splitting technique, a zone split is initiated at step 405. The split operation comprises creating two "children" zones out of the parent zone. The exact nature of how the split is accomplished will depend on the particular hash function utilized. For example and without limitation, where the hashkeys are based on a fixed prefix, the prefixes of the two children can be readily derived form the parent prefix by appending zero and one respectively, as disclosed in co-pending commonly-assigned Utility Patent Application "PEER-TO-PEER SYSTEM AND METHOD FOR PREFIX-BASED DISTRIBUTED HASH TABLE," referenced above, which is incorporated by reference herein.

A zone on the physical node must be evicted when the storage on the physical node is exhausted or when the number of hosted zones becomes greater than the number of available slots. Because a physical node does not actually have as much storage as it advertises through its available slots, it becomes possible for it to become full before any of its zones becomes full. Thus, a zone transfer at step 408 is initiated when either the node has filled up at step 407 or when a zone does not have a free slot at step 406.

When a zone must be transferred, a suitable physical node must be found. It is advantageous to permit a physical node to become a new host for a zone F generally if it satisfies the following preconditions: (a) the candidate has at least one free slot; and (b) the free space after the move must be at least δ higher than the free space at the source before the move, where δ is equal to half the storage used by F. The second condition helps prevent thrashing. Since information about the new host of the zone is not propagated instantly to all nodes which may keep pointers to it, it is advantageous to leave a forwarding pointer on the old host, e.g., in a data structure called a "trace cache." Since the new location would eventually be propagated through pings between nodes, the forwarding pointer can be discarded after the estimated propagation time.

Among the candidates satisfying the transfer preconditions, it would be preferable to choose the one with the highest amount of free space. The "best" candidate, however, would only be found by evaluating the transfer condition at each physical node in the system, i.e. using global knowledge. Since this is not preferable in a peer-to-peer system, it is advantageous to implement a local scheme which allows each physical node to have a set of candidate called by the inventors a "transfer set", preferably of some limited cardinality. Thus, in FIG. 4, at step 409, a search is made for a candidate from the transfer set and, at step 410, the zone transferred. This set would contain not only the candidates' network addresses, but also estimations of its free resources (e.g., slots and storage space) so that candidates can be ranked. This information about a node's free resources can be sent with each outgoing message. Any message could be used as the information carrier as the increase in the message length is minimal (probably one word only). For example, in addition to pings between nodes, write messages can be used because their number is proportional to the rate of growth (hence transfer) of the system. A physical node would keep information only about the last T distinct physical nodes, where T is the maximum cardinality of the transfer set. This not only bounds the space consumption at each physical node, but also allows the physical node to discard stale information.

FIG. 5 through FIG. 9 are charts illustrating utilization in a simulation of a peer-to-peer system under various conditions. The amount of traffic is measured by the transfer rate defined as the ratio of the total number of key transfers to the number of keys stored in the system. To assess the impact various utilization schemes have on the transfer rate, only write operations are generated. Every transfer of data, however, counts toward the total, including writes and zone moves. The number of transfers is cumulative in that it incorporates all the transfers that took place in the system since the start. While the order in which nodes or keys were added to the system does not influence the guaranteed utilization, it does have a big impact on the transfer rate. An extreme case is when all the necessary nodes are added to the system before any key is inserted. Since splits and transfers executed eagerly by empty zones do not move any data, the only data transfer is caused by subsequent write operations. For every key inserted into the system there is one transfer (or zero for the keys that are stored on the node issuing the write, but for a large enough system their number is negligible); thus, the lowest possible transfer rate is 100%. The other extreme is when nodes are only added when the system is full. This causes the system to shuffle around zones from nodes that filled up to nodes that have enough free space, until no such node can be found. With this scenario, an upper bound is measured of the transfer rate.

Figure 5:
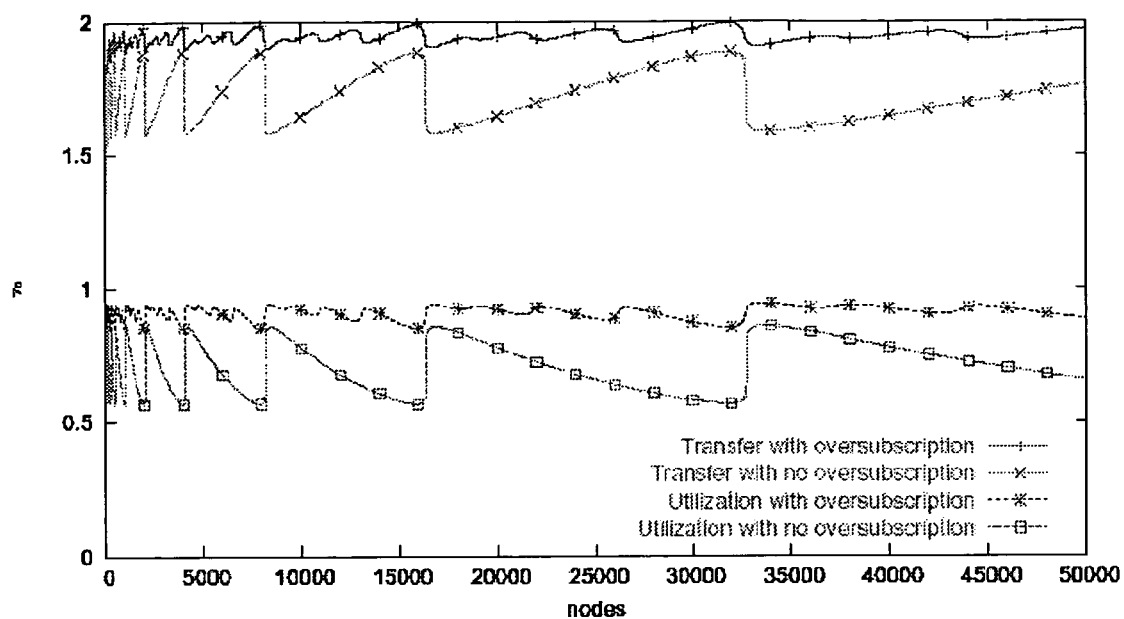
FIG. 5 is a graph showing the utilization and worst-case transfer rate as a function of the number of nodes in a system.

FIG. 5 shows the utilization and worst-case transfer rate as a function of the number of nodes in a system when each node has a storage space of four times SlotSize. The measurements are taken for two cases: with and without oversubscription. The oversubscription scheme increases the minimum utilization from 59% to 85%. Compared to the base case without oversubscription, the average transfer rate increases by about 12% from 1.75 to 1.95. On the other hand, the oversubscription does not have a "bandwidth penalty" for read operations; thus, in a system with 80% reads and 20% writes, the increase in bandwidth consumption is about 2.4%. The sinusoidal shape of the utilization graph for the scheme without oversubscription can be explained as follows. The utilization is highest when all zones cover the same area, and the zones are close to full. As the zones split and get transferred to new physical nodes, the utilization starts dropping very fast (corresponding to a very slow increase in usable capacity). The minimum is reached when all zones but one have been split and are about half full except the bid zone which is full. This case may cause a "system full" condition as insertion of a next key going to the big zone requires a new physical node addition. The minimum utilization in such case is close to 50%. Increasing the number of zones per node leads to a larger fraction of node's storage being dedicated to various data structures needed to each zone. This problem is shared by a simple aggregation scheme.

Note that the measured utilization of a particular scheme varies with the number of nodes in the system. The guaranteed utilization for a given scheme, however, is given by $(N-1)/N$ and thus it depends only on the number of slots, not the number of nodes. Based on this property of a guaranteed utilization independent of the system size, a credit-debit system can be run locally: after a given amount of storage is contributed locally, new data can be inserted there up to the size equal to the guaranteed utilization times the size of the contributed storage. With such organization in place, the actual utilization of the system is limited to the guaranteed utilization. The inventors refer to this scheme as oversubscription with threshold. It differs from the basic oversubscription in timing when the new storage is added—in this approach, the system is not allowed to achieve utilizations higher than the threshold. Its advantage is that it avoids paying the cost of additional bandwidth consumption used for achieving utilizations higher than the threshold.

Figure 6:
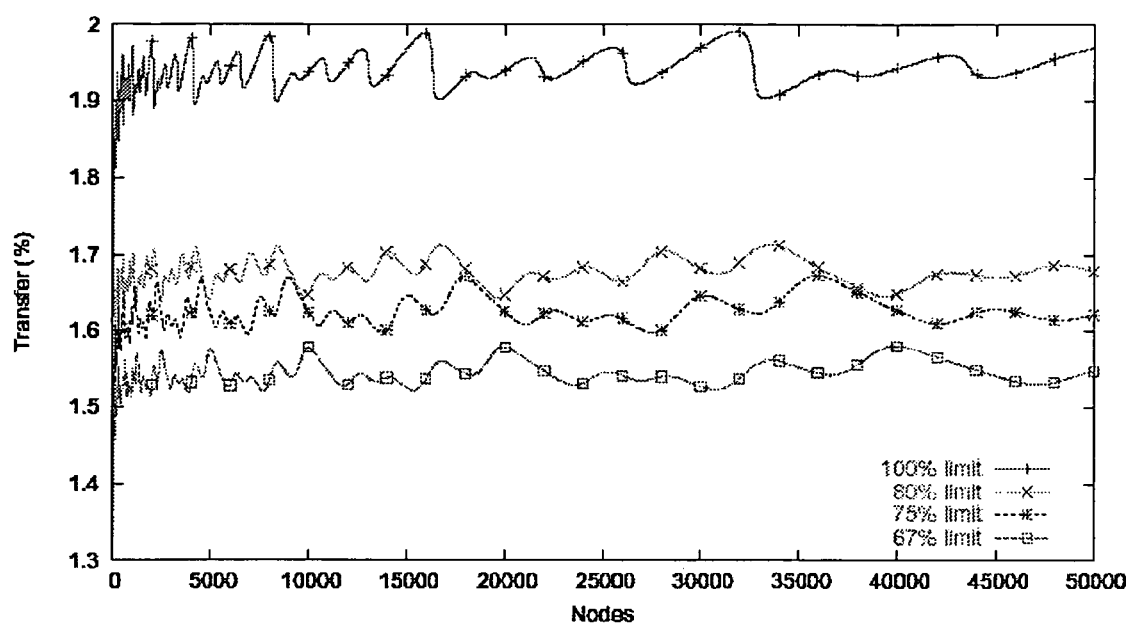
FIG. 6 is a graph showing the transfer rate of a system with N=4 at various pre-set utilization thresholds.

FIG. 6 shows the transfer rate of a system with N=4 at various pre-set utilization thresholds. Note that since the utilization of the system with oversubscription is bounded by the graph shown in FIG. 5, the minimum utilization coincides with the threshold with the exception of the case "no threshold" which has a minimum of 85%.

Figure 7:
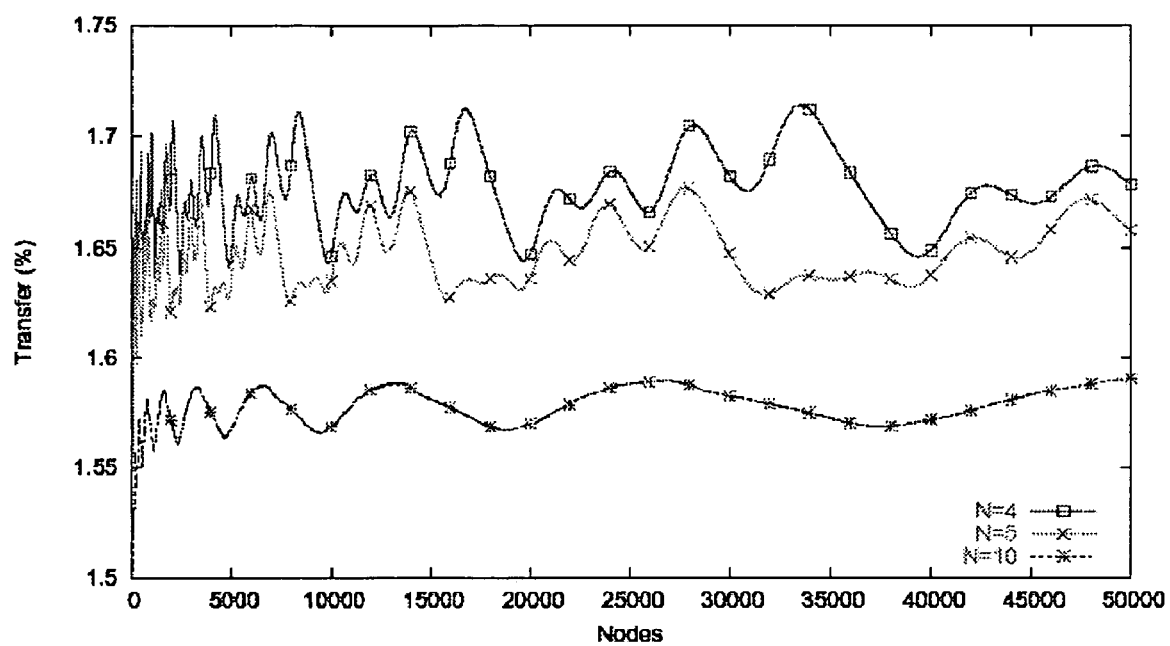
FIG. 7 is a graph showing the transfer rate when N is varied for the same guaranteed utilization.

FIG. 7 shows the transfer rate when N is varied (and consequently the number of slots given by 2*N−1) for the same guaranteed utilization (80%). The results show that higher values of N generate lower traffic for the same utilization. The results suggest that the parameters of the system are chosen by first deciding what is the desired guaranteed utilization from the minimum value of N is derived based on the formula $U=(N-1)/N$. At the cost of more state per node, the N can be increased over that value in order to reduce bandwidth requirements.

Figure 8:
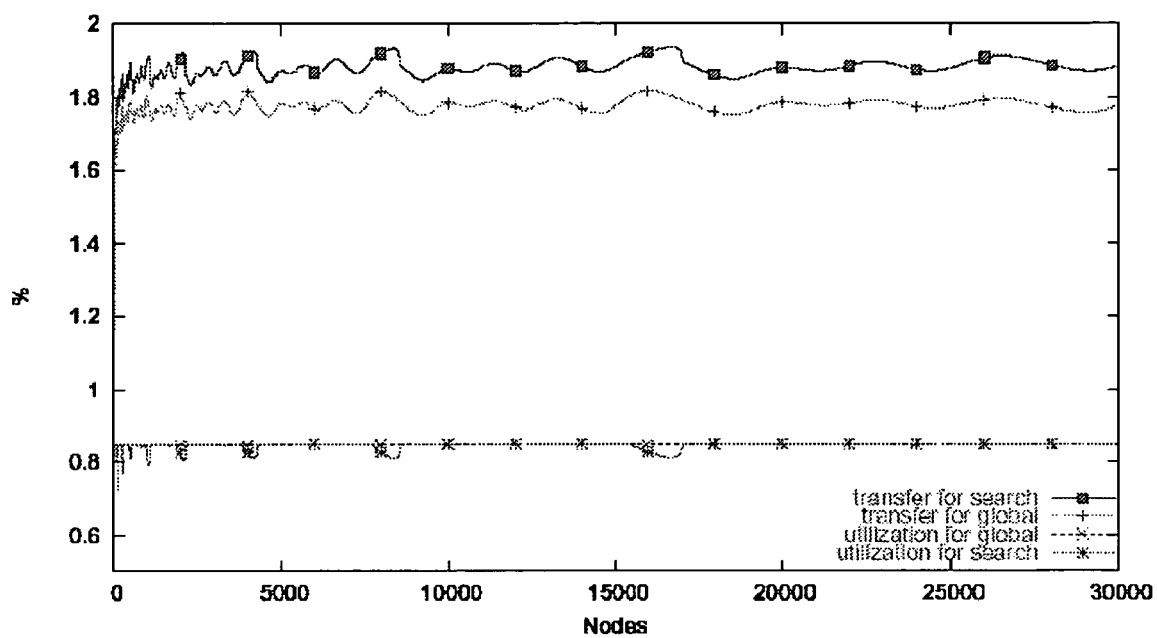
FIG. 8 is a graph showing a comparison between the utilization and transfer rates of global and local schemes.

FIG. 8 shows a comparison between the utilization and transfer rates of global and local schemes for searching for a transfer target using N=4 and an 80% utilization threshold when the transfer set is limited to 100 elements. The local scheme has a somewhat higher transfer rate and occasionally lower utilization than the global scheme (although still above the $(N-1)/N$ limit).

Figure 9:
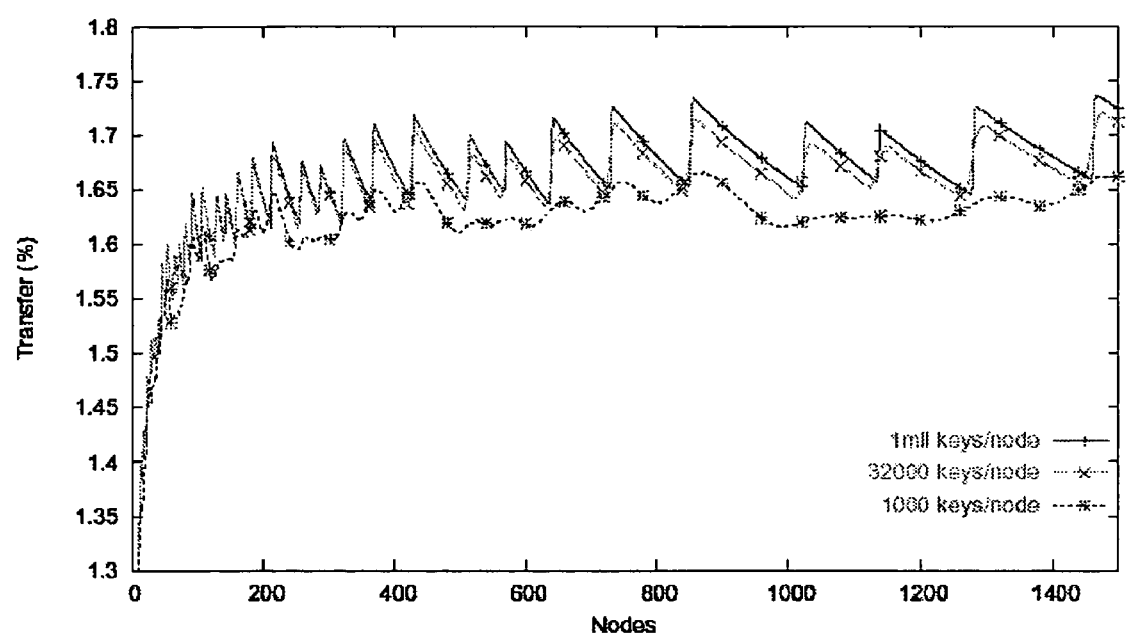
FIG. 9 is a graph showing the impact of the node capacity on the behavior of the system.

FIG. 9 shows the impact of the node capacity on the behavior of the system. With N=5 and a threshold of 80%, the capacity of the nodes is varied up to 1 million keys per node. As the number of keys per node is increased, the transfer rate increases slightly; but his effect is negligible when physical node capacity increases from 32,000 to 1 million keys. In general, after the number of keys per node (and consequently per zone) becomes big enough, there is little variation in zones' key densities, which makes such systems exhibit very similar characteristics in terms of transfer rate.

It will be appreciated that those skilled in the art will be able to devise numerous arrangements and variations which, although not explicitly shown or described herein, embody the principles of the invention and are within their spirit and scope.

What is claimed is:

1. A method for improving utilization in a peer-to-peer network having a plurality of nodes, the method comprising:
   hosting one or more storage slots in each node in the peer-to-peer network; wherein:
      each node comprises a respective amount of physical storage capacity;
      each storage slot represents a predefined amount of storage capacity;
      each node hosts a number of storage slots representing a total amount of storage capacity greater than the node's physical storage capacity, wherein each node is allocated 2×N−1 virtual slots, where N equals the physical storage capacity of the node divided by the predefined amount of storage capacity of a storage slot; and
      at each node, a first portion of the storage slots host storage zones and any remaining storage slots are allocated as free slot reserve storage slots;
   the method further comprising:
      storing data in the storage slots hosting storage zones; and
      when a storage slot hosting a storage zone reaches a full capacity of the storage zone,
         splitting the data in the storage slot hosting the storage zone into a first and second portion,
         converting a free slot reserve storage slot into a new storage slot hosting a storage zone, and
         transferring the second portion of the data to the new storage slot hosting the storage zone.

2. The method of claim 1 wherein a storage zone at a node is transferred to another node in the peer-to-peer network if the data inserted into the storage zones at the node fills the actual physical capacity of the node.

3. The method of claim 2 where a local search for candidate nodes in a transfer set is conducted prior to transfer of the storage zone.

4. The method of claim 1 wherein the new storage zone is transferred to and hosted by a free slot reserve storage slot on a different node when the storage zones hosted at the node exceed the storage slots allocated at the node.

5. The method of claim 4 where a local search for candidate nodes in a transfer set is conducted prior to transfer of the new storage zone.

6. The method of claim 1 wherein the data is associated with hashkeys of a hash function and where each storage zone is responsible for a subset of all hashkeys.

7. The method of claim 6 wherein the hashkeys are uniformly distributed by the hash function.

8. The method of claim 1 wherein the storage slots are of a fixed-size.

9. The method of claim 1, wherein each storage zone is hosted by a storage slot located within a particular physical node.

10. The method of claim 1, wherein a zone is hosted within a slot and a size of the slot is a system wide constraint representing the limit size to which a zone can grow before it fills the slot and must be split.

* * * * *